US012358253B2

(12) United States Patent
Cirette et al.

(10) Patent No.: US 12,358,253 B2
(45) Date of Patent: Jul. 15, 2025

(54) DEVICE AND METHOD FOR FORMING A CONTAINER BY FOLDING

(71) Applicant: SIDEL PARTICIPATIONS S.A.S., Octeville-sur-Mer (FR)

(72) Inventors: Damien Cirette, Corcelles-les-Citeaux (FR); Arnaud Prieur, Corcelles-les-Citeaux (FR)

(73) Assignee: SIDEL PARTICIPATIONS S.A.S., Octeville-sur-Mer (FR)

( * ) Notice: Subject to any disclaimer, the term of this patent is extended or adjusted under 35 U.S.C. 154(b) by 0 days.

(21) Appl. No.: 17/767,708

(22) PCT Filed: Oct. 9, 2020

(86) PCT No.: PCT/EP2020/078364
§ 371 (c)(1),
(2) Date: Apr. 8, 2022

(87) PCT Pub. No.: WO2021/069637
PCT Pub. Date: Apr. 15, 2021

(65) Prior Publication Data
US 2024/0116261 A1 Apr. 11, 2024

(30) Foreign Application Priority Data
Oct. 10, 2019 (FR) ...................................... 1911235

(51) Int. Cl.
*B31B 50/54* (2017.01)
*B31B 50/00* (2017.01)
(Continued)

(52) U.S. Cl.
CPC .......... *B31B 50/54* (2017.08); *B31B 50/0042* (2017.08); *B31B 50/005* (2017.08);
(Continued)

(58) Field of Classification Search
CPC ... B31B 50/54; B31B 50/0042; B31B 50/005; B31B 50/262; B31B 50/58;
(Continued)

(56) References Cited

U.S. PATENT DOCUMENTS 2,702,973 A * 3/1955 Schilling .................. B65B 7/26
53/131.2
2,734,324 A 2/1956 Chandler
(Continued)

OTHER PUBLICATIONS

International Search Report dated Nov. 26, 2020 for PCT/EP2020/078364.

*Primary Examiner* — Gloria R Weeks
*Assistant Examiner* — Mobeen Ahmed
(74) *Attorney, Agent, or Firm* — Blake T. Hudson

(57) ABSTRACT

A device for forming a container by folding a cardboard sheet having a lid and notably a tab. The forming device comprising a conveyor driving said cardboard sheet in a direction of travel and a device for folding over said lid. The folding-over device comprises a pressing surface for pressing on said lid, and the pressing surface is configured to move from an initial position toward a deployed position of folding said lid, and vice versa. The said pressing surface is mobile in said direction of travel, and comprises an endless belt motorized in said direction of travel.

13 Claims, 5 Drawing Sheets

Figure 1:
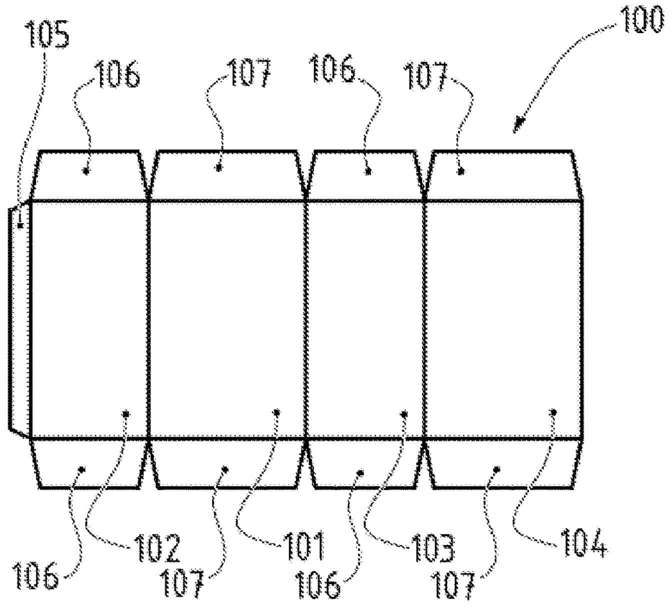

(51) Int. Cl.

| | |
|---|---|
| ***B31B 50/26*** | (2017.01) |
| ***B31B 50/58*** | (2017.01) |
| *B31B 50/04* | (2017.01) |
| *B31B 50/56* | (2017.01) |
| *B31B 120/30* | (2017.01) |

(52) U.S. Cl.

CPC ............ *B31B 50/262* (2017.08); *B31B 50/58* (2017.08); *B31B 50/042* (2017.08); *B31B 50/56* (2017.08); *B31B 2120/302* (2017.08)

(58) Field of Classification Search

CPC . B31B 50/042; B31B 50/56; B31B 2120/302; B65B 51/14; B65B 51/16; B65B 51/18; B65B 49/08; B65B 49/12

See application file for complete search history.

(56) References Cited

U.S. PATENT DOCUMENTS

| | | | | | | |
|---|---|---|---|---|---|---|
| 2,993,319 | A | * | 7/1961 | Ganbert | B65B 51/18 | 53/376.5 |
| 3,253,389 | A | * | 5/1966 | Miller | B65B 7/20 | 493/131 |
| 3,354,606 | A | * | 11/1967 | Miller | B65B 7/20 | 53/76 |
| 3,371,585 | A | * | 3/1968 | Moser | B31B 50/00 | 226/176 |
| 3,383,990 | A | * | 5/1968 | Cheu | B31B 50/262 | 493/23 |
| 3,466,843 | A | * | 9/1969 | Mumper | B65B 51/067 | 53/76 |
| 3,623,293 | A | * | 11/1971 | Boulay | B65B 7/20 | 53/138.2 |
| 4,044,658 | A | * | 8/1977 | Mitchard | B31B 50/00 | 493/141 |
| 4,215,525 | A | * | 8/1980 | Nigrelli | B65B 5/068 | 53/209 |
| 4,432,745 | A | * | 2/1984 | Eldridge | B31B 50/006 | 493/453 |
| 4,614,512 | A | * | 9/1986 | Capdeboscq | B31B 50/36 | 198/405 |
| 4,759,741 | A | * | 7/1988 | Chisholm, Jr. | B65H 5/34 | 493/182 |
| 5,092,827 | A | * | 3/1992 | McAdam, III | B31B 50/36 | 493/179 |
| 5,410,862 | A | * | 5/1995 | Janhonen | B65B 25/14 | 53/215 |
| 5,827,162 | A | * | 10/1998 | Rubin | B31B 50/56 | 493/34 |
| 5,997,459 | A | * | 12/1999 | Kruger | B31F 1/0022 | 493/182 |
| 6,622,461 | B2 | * | 9/2003 | Gambetti | B65B 51/023 | 493/131 |
| 6,729,105 | B2 | * | 5/2004 | Spatafora | B65B 19/221 | 53/376.5 |
| 6,910,314 | B2 | * | 6/2005 | Le | B65B 59/02 | 53/136.3 |
| 7,278,248 | B2 | * | 10/2007 | Vinh Le | B65B 59/02 | 53/136.3 |
| 7,647,751 | B2 | * | 1/2010 | Menta | B31B 50/006 | 53/381.1 |
| 8,529,421 | B2 | * | 9/2013 | Fallas | B65B 7/20 | 493/70 |
| 10,668,685 | B2 | * | 6/2020 | Ronquist | B31F 1/0022 | |
| 2002/0104289 | A1 | * | 8/2002 | Gambetti | B65B 51/023 | 53/376.5 |
| 2011/0177928 | A1 | * | 7/2011 | Fallas | B31B 50/36 | 493/180 |
| 2015/0141229 | A1 | * | 5/2015 | Flagg | B31B 50/00 | 493/309 |
| 2017/0057191 | A1 | * | 3/2017 | Herfurth | B31B 50/00 | |
| 2018/0009189 | A1 | * | 1/2018 | Ronquist | B31F 1/0022 | |
| 2018/0170587 | A1 | * | 6/2018 | Catellani | B65B 43/10 | |
| 2018/0297315 | A1 | * | 10/2018 | Stober | B31B 50/58 | |
| 2018/0333932 | A1 | * | 11/2018 | Ronquist | B31B 50/624 | |
| 2019/0291377 | A1 | * | 9/2019 | Akita | B31B 50/88 | |
| 2020/0385151 | A1 | * | 12/2020 | Desertot | B65B 35/24 | |
| 2022/0250776 | A1 | * | 8/2022 | Lelie | B65B 49/08 | |

* cited by examiner

DEVICE AND METHOD FOR FORMING A CONTAINER BY FOLDING

The present invention falls within the field of the shaping of cardboard sheets using folding in order to form containers in which to package at least one product but preferably a plurality of products.

For the purposes of the present invention, the term "product" covers a single object. Such a product is a vessel, such as a bottle or a vial, or else a can or even a carton. Such products may also be grouped together, positioned in a sleeve pack or "cluster" and/or wrapped in a film. A product may be made of any material, notably of plastic, of metal or even of glass. A product may be rigid or semirigid. Such a container is intended to contain, and this list is not exhaustive, a fluid, liquid, powders or granules, notably of the agri-foodstuff or cosmetic type. A product may exhibit any type of shape, symmetrical or otherwise, regular or irregular.

Such products are obtained on an industrial production line, undergoing a plurality of successive processing operations as they pass through dedicated workstations, such as, for example, the blow-molding of plastic bottles or vials, filling and capping, labeling, or even sterilization or pasteurization. Once processed, the finished products are packaged in groups into batches, the products being held together by a plastic film, notably shrink-wrapped through a film-wrapping operation, or else inside containers.

Such containers may take the form of cardboard cases or "cardboard boxes" for the packaging of products. Such cardboard boxes have a rectangular parallelepipedal shape, with an interior volume capable of accepting a group of products, in a staggered configuration but preferably arranged in a matrix of rows and columns, or even several groups of products superposed.

In a known way, the automated making-up of cardboard cases is performed by folding precut and preformed cardboard sheets also known as "box blanks".

With reference to FIG. 1 which depicts a view in elevation of one example of a cardboard sheet 100, laid out flat, it comprises a bottom 101, intended to accept the products on its upper face, which will be positioned on the inside once the container has been formed. On either side of said bottom 101, along the longitudinal edges thereof, the cardboard sheet 100 comprises two lateral walls, namely a left lateral wall 102 and a right lateral wall 103.

The cardboard sheet 100 also comprises a lid 104, along one longitudinal edge of one of the lateral walls, such as the right lateral wall 103 for example. Along an opposing longitudinal edge of the other lateral wall, respectively the left lateral wall 102, the cardboard sheet 100 comprises a tab 105. Alternatively, the tab 105 may be fixed to the lid 104, on the opposite side to the longitudinal edge connecting with said one of the lateral walls; said tab 105 is then commonly referred to as an "external sealing flap".

At each end, the cardboard sheet 100 comprises flaps, at least four of these, on the one hand, vertical flaps 106 connected to the lateral walls along their transverse edges and, on the other hand, horizontal flaps 107 connected to the bottom 101 and to the lid 104 along their transverse edges.

Figure 2:
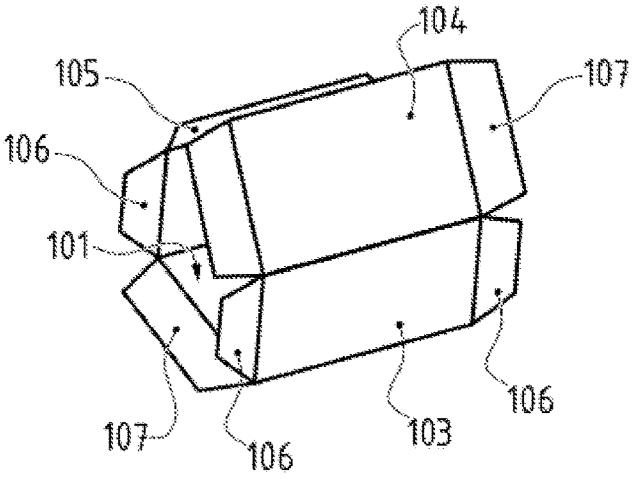
Figure 3:
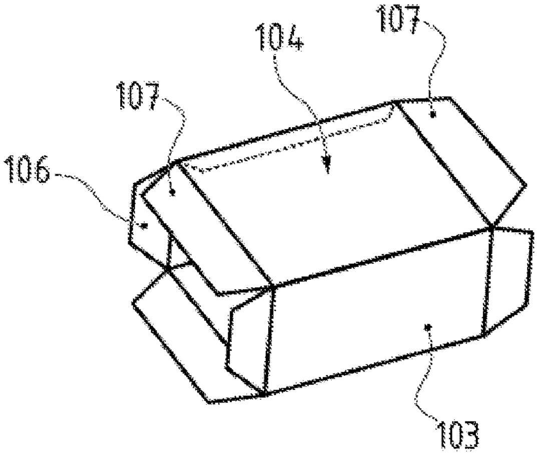

With reference to FIG. 2 which depicts a perspective view of the sheet of FIG. 1 during the process of being folded into shape, after a prior step of folding the left 102 and right 103 lateral walls orthogonally with respect to the bottom 101, the tab 105 is folded orthogonally, with an application of glue made on its exterior face, whereas the lid is folded over until it comes into contact with said exterior face of the tab 105, and with the applied glue, as visible in FIG. 3, thus delimiting the interior volume of the container 1 in the form of a cardboard case.

Alternatively, in the event of a container provided with an external sealing flap, the lid 104 is folded first of all, then the exterior sealing flap is folded over on top of the previously glued adjacent lateral wall.

Next, during other successive steps, for each end, the vertical flaps 106 are folded orthogonally, with an application of glue to the exterior face, then the horizontal flaps 107 are folded over until they come into contact with the corresponding vertical flaps 106 and with the applied glue. The cardboard case 1 is thus formed and completely sealed, as visible in FIG. 5.

It will be noted that the forming achieved by folding the cardboard sheet 100 is generally performed with the products already grouped together and positioned on the upper face of the bottom 101. The folding is therefore done around the products that will be enclosed in the container 1 thus obtained by the folding of the cardboard sheet 100. This boxing operation is commonly known as "wrapping" (using a wrap-around blank).

More specifically, the forming of such a container 1 from a sheet 100 can be performed sequentially, step-by-step, with the sheet 100 halted at each step. In the type of machine to which the invention relates, the forming is preferably performed continuously, with the sheet 100 traveling on conveyors passing through various workstations dedicated to the successive steps of folding of the various parts of said sheet 100, namely first of all the simultaneous folding of the left 102 and right 103 lateral walls, then the folding of the tab 105 which occurs at the same time as the lid 104 is folded over to form the volume of the future container 1, then the folding of the vertical flaps 106, followed by the folding of the horizontal flaps 107.

The invention is more especially aimed at a continuous forming by folding of a cardboard sheet with a view to forming a container, specifically the folding of the vertical flaps of such a cardboard sheet.

Such a folding operation is performed by a forming device comprising several successive workstations dedicated to each of the aforementioned folding steps. At least one conveyor, on its upper face, transports each cardboard sheet in a direction of travel from upstream to downstream through the various modules as far as at least an output conveyor. In particular, the forming device comprises means for folding the tab and means for folding over the lid, these means acting in synchrony with the movement of the case, with a view to first of all folding the tab and then folding the lid over onto it. In particular, the end of the folding of the tab may be performed by the end of the folding-over of the lid. In fact, these operations are performed almost simultaneously.

As a result, the means for folding the tab is situated on one side of the device, whereas the means for folding-over the lid are situated on the opposite side, namely on the right or on the left depending on the configuration of the sheet. The folding and folding-over means extend in the one same zone so that these processing operations can be performed almost simultaneously.

These folding and folding-over operations present difficulties in ensuring that the distal edge of the lid comes into perfect alignment along the edge corner on the opposite side at the fold of the tab. Alignment needs to be achieved to within a millimeter along the entire length of the sheet.

What is more, the folding of the tab and the folding-over of the lid are performed above the point of gravity, unlike the prior foldings of the lateral walls which are held by the products being transported on the upper face of said sheet. Because the top of the cardboard sheet is particularly flexible, optimal folding and folding-over are thereby rendered considerably more complex.

In this context, a known forming device comprises folding and folding-over means in the form of rails fixed to the structure of the forming device. Such rails have a substantially helical curved profile, extending vertically at an upstream end as far as a downstream end which is horizontal. Thus, the movement of the sheet on the conveyor first of all brings the downstream part of the tab into contact with the curvature of the profile of the folding means and advancement along said rail pushes the tab over as the sheet progressively advances. The same system is applied for the lid against the rail of the folding-over means.

Such a solution has a disadvantage caused by the stresses applied to the tab and the lid as they move against fixed rails, causing twisting in the folding and folding-over from the downstream part toward the upstream part of the sheet as it moves along. Such twisting is likely to cause the final position of the tab and/or of the lid covering the tab to shift, impairing the squareness of the container that is formed.

Specifically, an optimal rectangular parallelepipedal shape with the walls properly orthogonal is important and needs to be optimal, firstly, for the sake of the esthetic appearance and correct packaging of the products, but also and especially, when several containers are to be stacked, notably on pallets. The deformation of one single case is liable to unbalance a stack of containers, making them precarious and dangerous for operators to handle.

Furthermore, incorrect folding of the tab, and especially offset folding-over of the lid may cause the products to shift, particularly in the case of lightweight and slippery products such as metal cans. Such shifting of the products with respect to the interior volume of the partially formed sheet is liable to interfere with the subsequent steps of folding the vertical flaps followed by the folding of the horizontal flaps.

A forming device has therefore been conceived which comprises folding means and folding-over means in the form of horizontal pushers, which deploy transversely, the end of each pusher coming to bear, on the one side, against the tab and, on the opposite side, against the lid, with the one set being offset with respect to the other in the direction of travel of the container so to fold the tab first, and then fold the lid over. While such forming by pushing reduces the twisting, it still presents the disadvantage of applying a pressing force extending transversely and horizontally with respect to the longitudinal movement of the sheet past this system, which may introduce longitudinal fractional forces liable to deform the case.

One known alternative described in document U.S. Pat. No. 2,734,324 is to mount a pusher plate on a mobile carriage able to move in the direction of travel of the case, to accompany the movement of the part that is to be folded over at the moment at which the lateral pressure is applied. However, such a carriage performs successive outbound and return movements between the cases that are to be formed, leading to a reduction in the rate at which said cases are conveyed by increasing the spacing between two successive cases so as to allow the carriage enough time to return to its initial position after having moved downstream. Furthermore, such a to-and-fro movement places great demands on the mechanics and motorization of such a carriage, generating jolts at the end of travel, these jolts being all the more violent if the speed of travel is high in order to keep pace with the rate at which the cases that are to be formed are conveyed.

It is an object of the invention to alleviate the disadvantages of the prior art by proposing a folding-over of the lid that is performed while the movement of the sheet is accompanied, using a pushing surface that is designed to be mobile on a support that is fixed with respect to the path of movement of the case that is to be formed.

As a subsidiary issue, the invention also provides accompanied folding of the tab.

In order to achieve this, the invention relates to a forming device of which at least the means for folding over the lid have a contact surface able to move in the direction of travel of the sheet.

Furthermore, such folding-over means extend longitudinally, applying a distributed force pressing on part of the length of the lid.

Furthermore, these folding-over means may be mounted with the ability to rotate, according to the angular travel of the lid as it pivots about or parallel to its fold line.

Thus, according to the invention, the device for forming a cardboard sheet by folding, said sheet comprising at least a lid and notably at tab, comprising at least:

- a conveyor driving said cardboard sheet in a direction of travel;
- means for folding over said lid;
- said folding-over means comprising at least a pressing surface for pressing on said lid, said pressing surface being actuated in a movement from an initial position toward a deployed position of folding said lid over, and vice versa.

Such a forming device is characterized in that

- said pressing surface is mobile in said direction of travel;
- said pressing surface comprising at least an endless belt motorized in said direction of travel.

As a result, the mobile surface in the form of a belt driven at the speed of travel of the case is able to accompany the progress thereof without causing jolts (shocks) or deformations at the moment of contact and of pressing for performing the folding, while at the same time overcoming the need for detrimental outbound and return movements. According to additional nonlimiting features, said folding-over means may comprise:

- pinions on which said belt is mounted:
- internally between said pinions, along the pressing surface, a guide against which the back of said belt presses.

Said pressing surface may comprise a plurality of wheels that are motorized in said direction of travel.

The forming device may comprise at least one controller controlling, in synchronized manner, at least the actuation of the movement of said pressing surface and the mobility thereof in said direction of travel with respect to the driving of said conveyor (3).

Said folding-over means may comprise a fixed structure, said pressing surface being mounted with the ability to pivot with an angular rotation from said at least vertical initial position to said deployed position, and vice versa.

The forming device may comprise means for folding said tab, which means are provided with a wheel having a pressing periphery following a folding path of said tab when said wheel is actuated in controlled angular rotation.

Said pressing periphery may exhibit a spiral curve.

Figure 4:
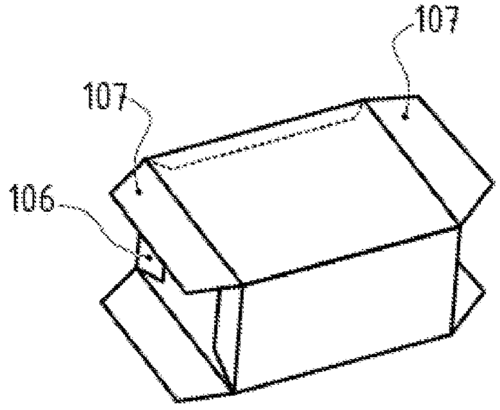
Figure 5:
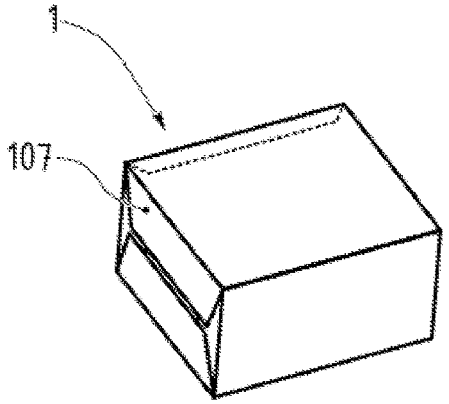
Figure 6:
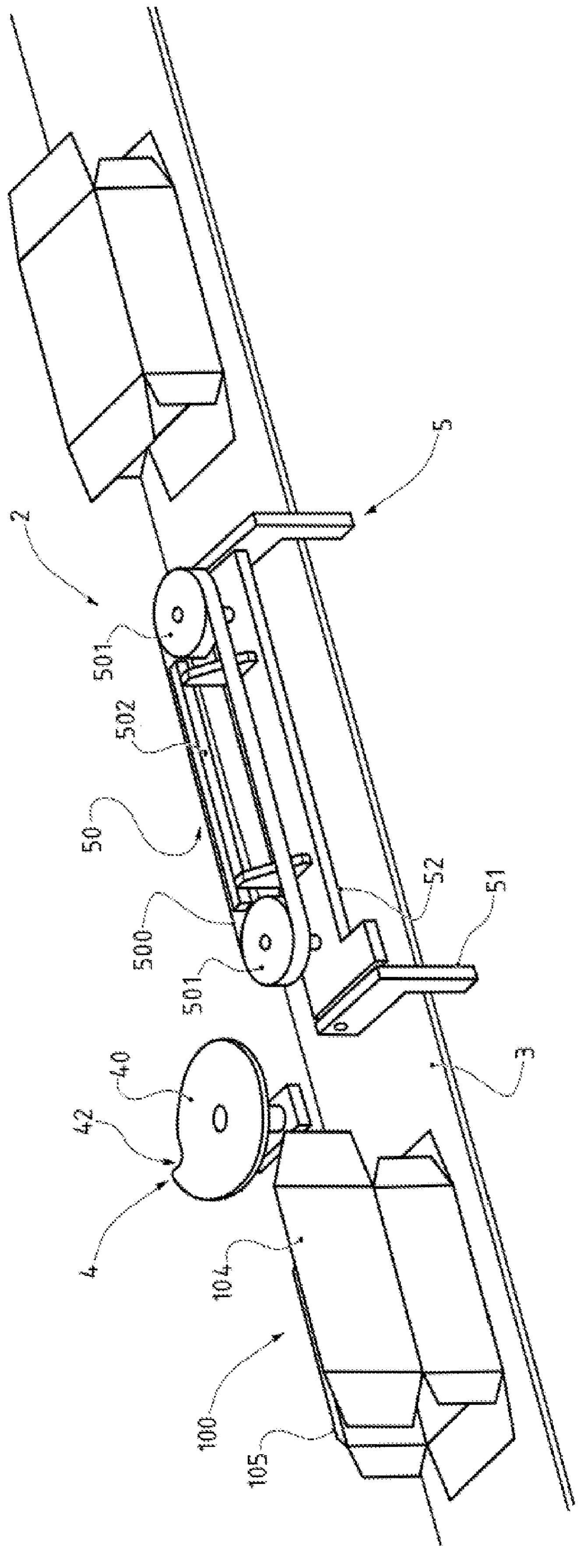
Figure 7:
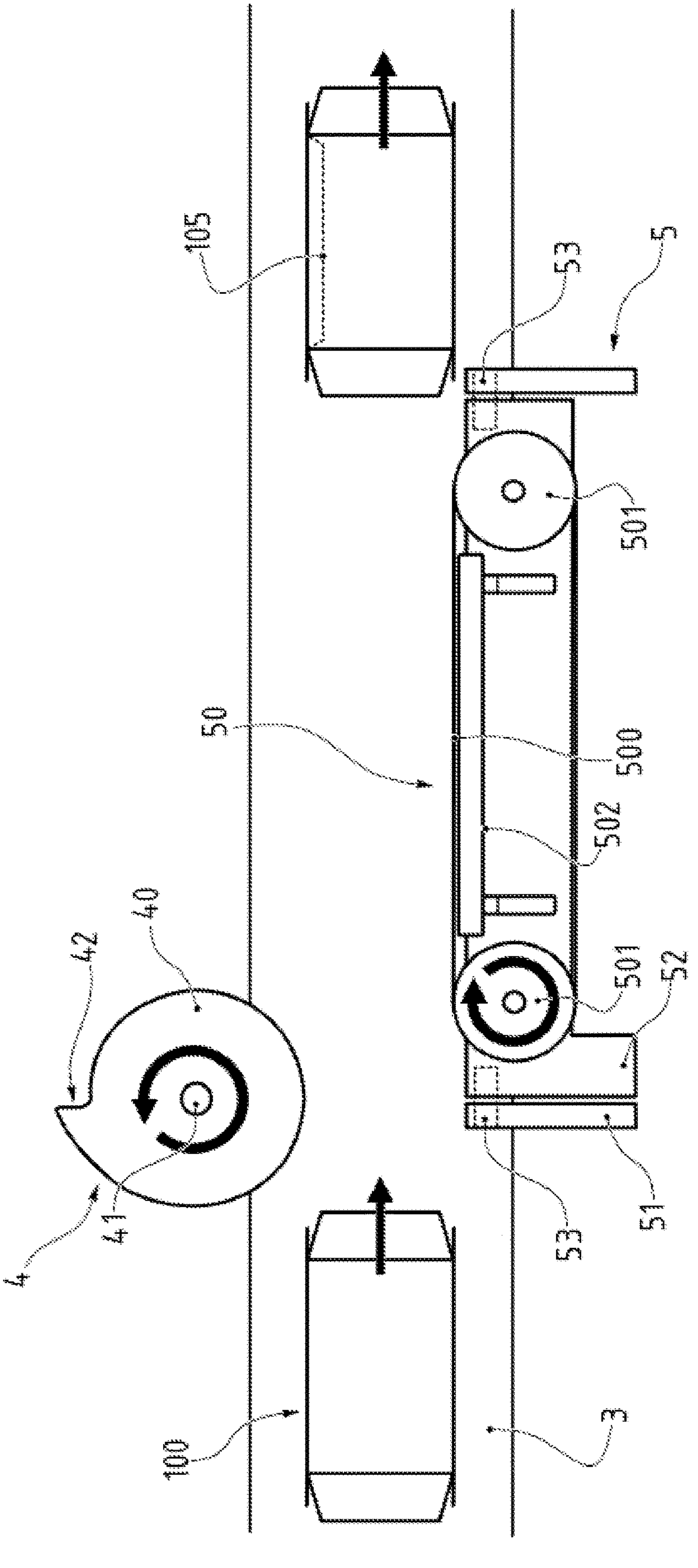
Figure 8:
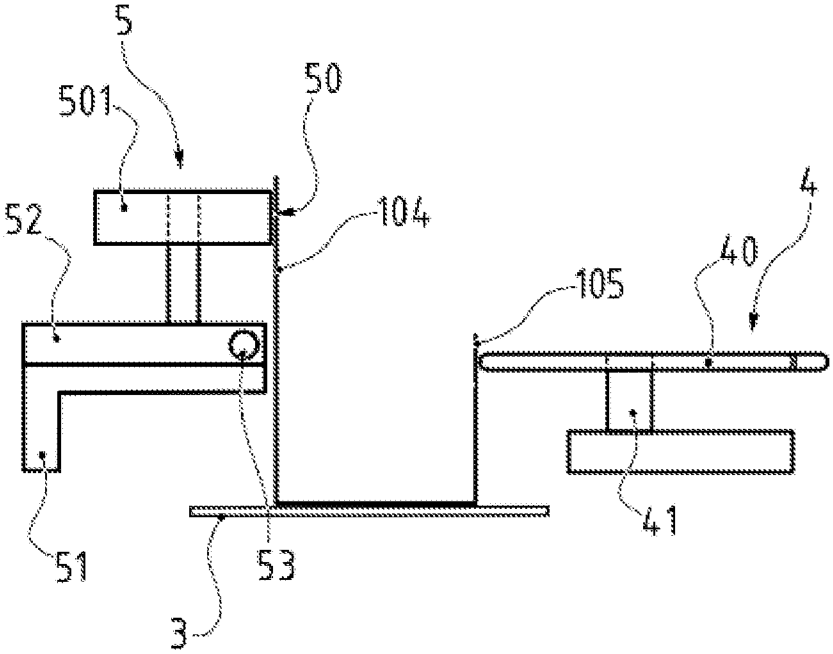
Figure 9:
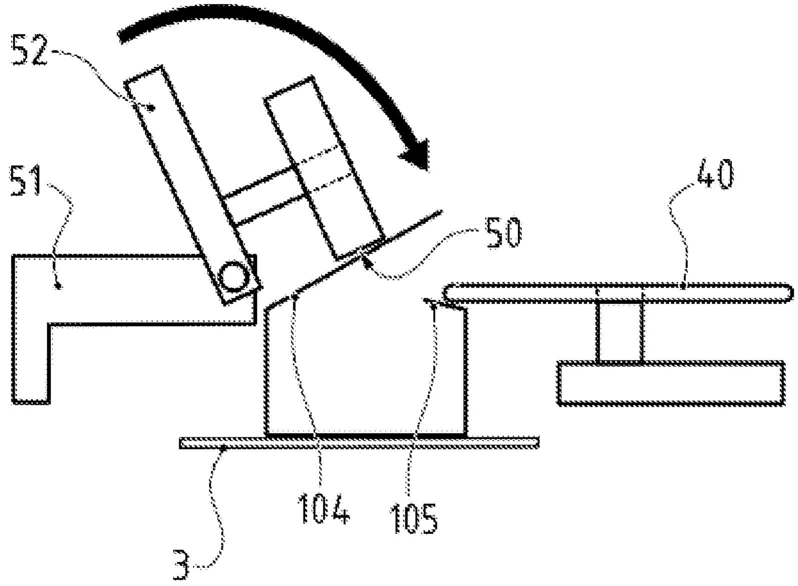
Figure 10:
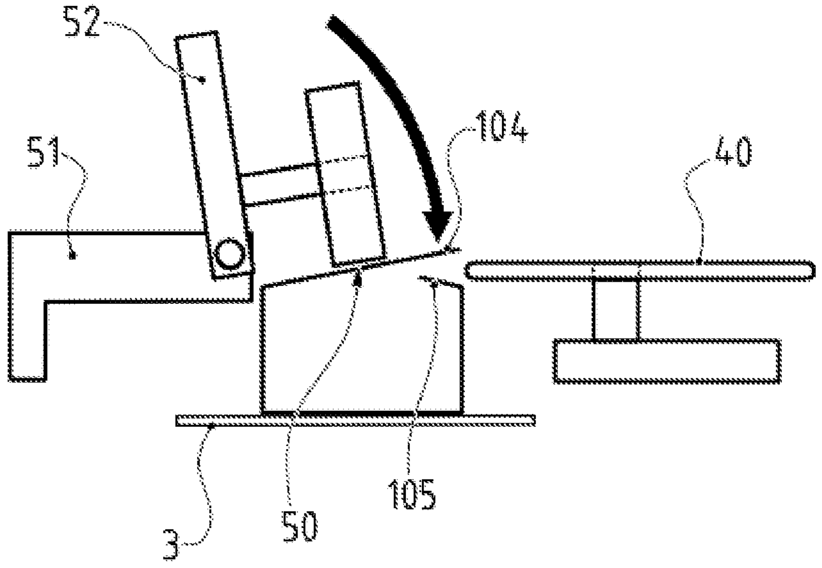

Other features and advantages of the invention will emerge from the following detailed description of nonlimiting embodiments of the invention, with reference to the appended figures, in which:

FIG. 1 schematically depicts a view in elevation of one example of a cardboard sheet;

FIG. 2 schematically depicts a perspective view of said cardboard sheet of FIG. 1 after a first step of folding the lateral walls;

FIG. 3 schematically depicts a perspective view of said cardboard sheet of FIG. 1 after a second step of folding the lid over onto the tab;

FIG. 4 schematically depicts a perspective view of said cardboard sheet of FIG. 1 after the folding of the vertical flaps;

FIG. 5 schematically depicts a perspective view of said cardboard sheet of FIG. 1 after the folding of the horizontal flaps, said case thus being formed;

FIG. 6 schematically depicts a perspective view of a forming device according to one embodiment, notably showing the conveying of two partially formed sheets before and after the folding of the tab and then the folding-over of the lid:

FIG. 7 schematically depicts a view in elevation of the forming device of FIG. 6;

FIG. 8 schematically depicts a view in vertical section of the forming device of FIG. 7, notably showing a first position feeding a partially formed sheet with a tab and a lid prior to folding;

FIG. 9 schematically depicts a view similar to FIG. 8, in a second position of folding the tab and starting to fold over the lid;

FIG. 10 schematically depicts a view similar to FIG. 9, in a third position after the tab has been completely folded and at the end of the folding-over of the lid; and FIG. 12 schematically depicts a view similar to FIG. 10, in a fourth position with the lid folded over.

In the context of the present invention, unless explained otherwise, it will be noted that the term "sheet" encompasses the cardboard sheet in the form of a flat box blank and also throughout all of the folding steps when the case is partially formed, up to the point at which a fully formed container 1 is obtained. Likewise, unless stipulated otherwise, the term "container" corresponds to a cardboard case that has been fully formed, namely after its horizontal flaps have been folded.

The present invention relates to the forming of a container 1 by folding of a cardboard sheet 100.

As mentioned previously, a container 1 may take the form of a cardboard case as visible in FIG. 5. A container 1 is intended for the packaging of products. In order to do that, a container 1 has a rectangular parallelepipedal shape, with an interior volume capable of accepting a group of products, in a staggered configuration but preferably arranged in a matrix of rows and columns, or even several groups of products superposed.

It will be noted that a product is an individual object of vessel type, such as a bottle or a vial, or else a can or even a carton. A plurality of products may also be grouped together, positioned in a sleeve pack or "cluster" and/or wrapped in a film. A product may be made of any material, notably of plastic, of metal or even of glass. A product may be rigid or semirigid. Such a container is intended to contain, and this list is not exhaustive, a fluid, liquid, powders or granules, notably of the agri-foodstuff or cosmetic type. A product may exhibit any type of shape, symmetrical or otherwise, regular or irregular.

To improve legibility of the drawings, the products have not been depicted in the figures. As mentioned previously, the automated making-up of containers 1 is performed by folding precut and preformed cardboard sheets 100 also known as "box blanks".

The invention is quite especially aimed at the forming of a container 1, notably continuously, by the folding of a cardboard sheet 100. Such continuous forming is achieved by having a cardboard sheet 100 travel through an installation dedicated to the packaging of products.

It will be noted that, within the meaning of the invention, unless stipulated otherwise, travel is in a direction of travel notably visible in FIG. 7; this direction of travel extending longitudinally through the installation, notably in a direction from upstream to downstream. The following description of potential positions is to be understood in relation to this direction of travel, particularly so far as the terms "on either side", "on the right" or "on the left" are concerned.

Such an installation comprises a plurality of successive workstations involved in folding the various parts of each sheet 100, while in a synchronized manner accompanying its movement, until a corresponding container 1 is obtained.

One or more workstations of the installation may be or form part of a device 2 for the forming of a container 1 by the folding of a cardboard sheet 100 according to the invention. As a preference, such a forming device 2 is dedicated to the folding of the tab 105 which is performed approximately at the same time as, or before, the folding-over of the lid 104 of said sheet 100. In short, said sheet 100 comprises at least a tab 105 and a lid 104.

Therefore, the forming device 2 or else a workstation situated further upstream, may perform the folding of other parts of the sheet 100, such as the simultaneous folding of the left 102 and right 103 lateral walls, and then said device 2 or else another workstation situated further downstream may perform the folding of the vertical flaps 106 followed by the folding of the horizontal flaps 107. Furthermore, the folding of the tab 105 and the folding-over of the lid 104 may be performed before, during or after the folding of the lateral walls 102, 103.

Moreover, at the entry to the installation, a workstation provides a supply of products, preferably grouped, and laid-flat cardboard sheets 100. Such a supply workstation notably sets the products down the upper face of the bottom 101 of each sheet 100.

That being the case, according to the invention, the forming device 2 comprises at least one conveyor 3. This conveyor extends substantially horizontally, receiving each sheet 100 on its upper face. It may be of any type, preferably of the endless-loop type Furthermore, said endless loop may take the form of a moving band conveyor, a moving belt conveyor or a chain conveyor. Said conveyor 3 therefore drives said sheet 100 in said direction of travel, together with the products thus transported on the sheet 100.

This conveyor 3 may extend over all or part of the installation, notably from the supply workstation.

On the one hand, as a preference, the forming device 2 comprises means 4 for folding said tab 105.

On the other hand, the forming device 2 comprises means 5 for folding over said lid 104. Furthermore, such a forming device 2 may comprise only folding-over means 5 without necessarily comprising folding means 4, notably in instances in which a sheet 100 has no tab 105.

Depending on the configuration of the cardboard sheet 100 provided with a tab 105, said tab 105, attached to the opposite lateral wall to the lid 104, may be folded just before the lid 104 is folded over, or else the lid 104 is folded over and then the tab 105, also referred to as an "external sealing flap", attached to this lid is folded to overlap the corresponding lateral wall.

According to the embodiments depicted in the figures, the folding-over means 5 fold the lid 104 so that it overlaps the tab 105 that has been at least partially folded beforehand. As a result, the folding means 4 may be positioned upstream or downstream relative to the folding-over means 5, such that the folding of the tab 105 occurs first, or after the lid 104 has been folded over.

It will be noted that, in the case of a tab 105 independent of the lid 104, the folding of the tab 105 may occur simultaneously or almost simultaneously with the folding-over of the lid 104. Specifically, the folding-over of the lid 104 may begin just after the start of the folding of the tab 105, so that at the end of the folding-over, said lid 104 completes the folding of said tab 105 by pressing against same.

In either instance, the folding means 4 are situated on one side, whereas the folding-over means 5 are situated on the other side, with respect to the conveyor 3. According to the embodiment depicted in FIG. 6, the folding means 4 are on the left side and the folding-over means 5 are on the right side, according to the direction of travel of the sheet 100, although the reverse is also possible depending on the position of the lid 104 with respect to the direction of travel. The folding means 4 and the folding-over means 5 are therefore situated one on each side of the sheet 100 that is to be processed.

Furthermore, the folding means 4 and the folding-over means 5 are situated in the one same longitudinal region in which the operations of folding the tab 105 and of folding over the lid 104 are performed, offering two symmetrical thrusts pushing on the sheet from each side when the forces needed for folding said tab 105 and for folding over the lid 104 are applied, thereby limiting the risks of deformation.

As far as the folding means 4 are concerned, these may be of any type, such as a horizontal transverse pusher or a cam for example.

According to one embodiment, said folding means 4 comprise a wheel 40 having a pressing periphery following a folding path of said tab 105 when said wheel 40 is actuated in controlled angular rotation. In other words, the shape of the wheel 40 is determined so that its periphery comes to press against the outside of the tab 105 and so that the rotation of the wheel 40 gives rise to a path that allows the tab 105 to be folded, pushing it over inward.

In particular, the periphery of the wheel 40 may have a radius that increases with respect to the opposite direction of rotation: the peripheral edge will therefore diverge from the center of rotation of the wheel 40, allowing the tab 105 against which the periphery is running to be pushed over from the outside toward the inside.

Furthermore, the rotation of the wheel 40 is controlled with regard to its periphery, so that it runs along the surface of the tab 105, said tab 105 being pushed over as the sheet 100 progressively advances and said wheel 40 progressively rotates. As a result, it is necessary to synchronize the rotational speed of the wheel 40 with respect to the speed at which the sheet 100 is driven by the conveyor 3. This rotational speed is therefore also dependent on the periphery of said wheel 40. Such management is performed by a suitable controller (not depicted). In particular, the speed of each point on the periphery is substantially equal to the speed of travel of the sheet 100, so as to maintain reduce any force interfering with said longitudinal travel of said sheet 100.

The rotational speed of the wheel 40 may be fixed or variable, whether this is at the moment of bending, or whether this is after the folding of a tab 105 of a first sheet 100 and before the folding of the tab of the next sheet 100. In particular, the wheel 40 can be accelerated or decelerated, at any moment, notably for angularly repositioning it between two successive sheets 100, or also in order to maintain a constant peripheral speed.

It will be noted that the folding of the tab 105 is performed at a substantially orthogonal angle. Said wheel 40 therefore extends horizontally or substantially horizontally. As a result, the rotation of the wheel 40 applies transverse pressure to the tab 105 with respect to the direction of travel of the sheet 100.

The wheel 40 is mounted on a shaft 41 driven in rotation by a suitable motorization system.

As a preference, as visible in FIGS. 6 and 7, said pressing periphery of the wheel 40 exhibits a spiral curve. In short, the wheel 40 is in the overall shape of a spiral, likeable to a snail.

As visible in FIGS. 6 and 7, the spiral wheel 40 may have a cutout 42. The cutout 42 coincides with the end of the path of folding of the tab 105 by the wheel 40. In short, with regard to the direction of rotation and depending on the angular position of the wheel 40, the periphery of the wheel 40 is not in contact with the tab 105 at, and just before, the cutout 42. From the cutout 42 onward, the periphery of the wheel 40 diverges from the center of rotation and comes into contact with the outside of the tab 105 and rolls along it, pushing it over inward, as it travels along said periphery, until it once again reaches said cutout 42.

The folding means 4 provided with a wheel 40 are able to fold the tab 105 while accompanying the movement of the sheet 100, limiting the risks of deformation or incorrect folding during the course of this operation.

As far as the folding-over means 5 are concerned, these comprise at least a pressing surface 50 pressing on said lid 104.

In addition, said pressing surface 50 is actuated in a movement from an initial position to a deployed position in which said lid 104 is folded over, and vice versa. In other words, the surface 50 is mobile so as to come into contact with and push the lid 104 from the outside until it is completely folded over, namely folded over at a right angle. In short, the folding-over movement is performed essentially transversely, namely with at least a component extending horizontally or substantially horizontally, with respect to the direction in which the sheet 100 is being made to travel by the conveyor 3.

Furthermore, in the initial position, the surface 50 of the folding-over means 5 is retracted and does not interfere with the travel of the sheet 100. In short, in transverse section, the surface 50 extends angularly on the outward side or opposite side to the conveyor, though still on a plane containing the lid 104 prior to folding-over. In particular, in the initial position, as a preference, the surface 50 extends at least vertically or substantially vertically, as can be seen in transverse section in FIG. 8.

In one particular instance, in which the folding-over of the lid 104 is performed before or during the folding of the lateral walls 102, 103, the orientation of the surface 50 may then be adapted accordingly.

According to one embodiment, said folding-over means 5 comprise a fixed structure 51. Such a structure 51 therefore acts as a chassis and can be attached to the floor or mounted on an element of the forming device 2, such as on the fixed part of the conveyor 3 for example.

As a result, said pressing surface 50 is mounted mobile on the structure 51. In particular, as visible notably in FIGS. 8 to 11, the surface 50 is mounted with the ability to pivot with respect to said structure 51 in an angular rotation from said initial position to said deployed position and vice versa. In short, the surface 50 is secured to a support 52 which rotates relative to the structure 51. The surface 50 is therefore able to pivot, preferably through an angular travel of at least 90 degrees (90°). In particular, the support 52 may be mounted with the ability to rotate about at least one pivot 53.

As mentioned previously, said initial position is at least vertical.

Furthermore, in the deployed position, the folding-over means 5 may apply pressure to the folded-over lid 104, in order to at least temporarily hold it in place.

Alternatively, according to another embodiment, said surface 50 is mounted for translational movement, namely transversely, notably horizontally or substantially horizontally, with respect to the structure 51.

Figure 11:
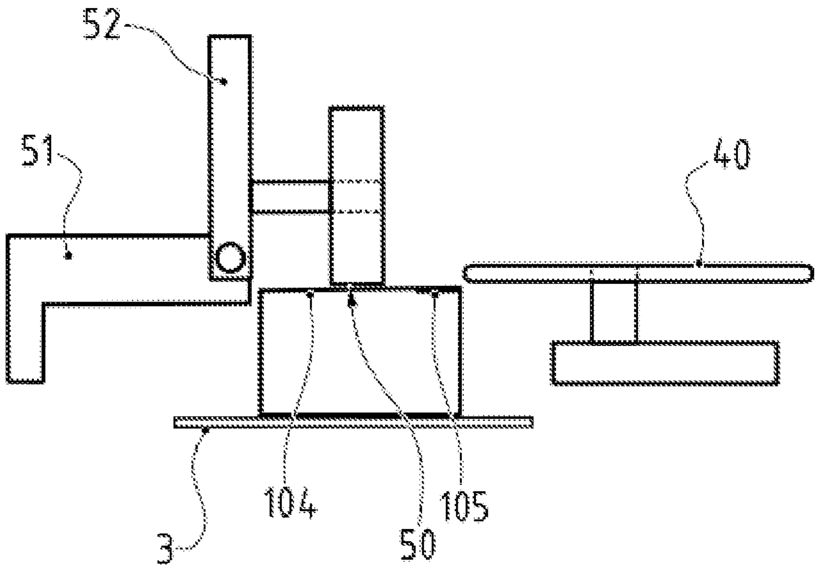

Thus, as the surface 50 deploys, it pushes the lid 104 until it reaches the deployed position in which said lid 104 is folded over, as visible notably in FIG. 11.

Advantageously, the invention plans to fold the lid 104 over while accompanying the longitudinal movement of the sheet 100. In other words, the folding-over of the lid 104 is performed in synchrony with the progression of the sheet 100.

In order to do this, said pressing surface 50 is mobile in said direction of travel. In other words, the surface 50 is also mobile with a longitudinal component.

According to one embodiment notably visible in FIGS. 6 and 7, said pressing surface 50 comprises at least an endless belt 500 motorized in said direction of travel. Furthermore, such a belt 500 then extends longitudinally over a distance and travels at a speed dependent on the speed at which the sheet 100 is driven, so as to come into contact with the surface of the lid 104 without generating any friction liable to slow the sheet 100. The movement of the belt 500 therefore accompanies the lid 104 as it is moved along by the conveyor 3.

In the corresponding embodiment, the surface 50 moves relative to its support 52. In particular, the folding-over means 5 comprise pinions or pulleys 501 over which said belt 500 is mounted. The pinions 501 are then mounted on the support 52.

According to one embodiment, as visible notably in FIGS. 6 and 7, the folding-over means 5 comprise, internally between said pinions 501, along the surface 50, a guide 502 against which the back of said belt 500 presses. Such a guide 502 stiffens the belt 500 from the inside between the pinions 501, at the opposite side from the side that does the pressing, avoiding potential deformation in deflection and ensuring perfect linearity of the surface 50 pressing against the external face of the lid 104.

According to another embodiment, said pressing surface 50 comprises a plurality of wheels motorized in said direction of travel. In the corresponding embodiment, the wheels may then be mounted on the support 52 and all rotationally driven at identical speeds.

Furthermore, a suitable motorization system is able to drive the surface 50, notably when it takes the form of the belt 500, by rotationally driving the pinions 501, or when it is in the form of motorized wheels. Such a motorization system may be carried on board, notably within the support 52, but is preferably achieved by slaving it to another motorization system, such as that for the conveyor 3 or for any other element of the forming device 2. This slaved dependency may be achieved by means of a suitable mechanical transmission.

According to a preferred embodiment, the forming device comprises at least one controller controlling, in synchronized manner, at least the actuation of the movement of said pressing surface 50 and the mobility thereof in said direction of travel with respect to the driving of said conveyor 3.

In the corresponding embodiment, the controller is therefore able to manage, on the one hand, the rotational movement of the support 52 of the surface 50, and also the speed at which its belt 500 is driven with respect to the speed at which the sheet 100 that is to be processed is progressing.

As mentioned previously, such a controller may also manage the speed at which the folding means 4 are driven, particularly the rotational speed of the wheel 40, according to the travel of the sheet 100.

Such a controller may in the conventional way comprise computer means and/or automatic means necessary for its operation and for its configuration by an operator.

As a subsidiary issue, the forming device 2 may comprise retaining means for keeping the lid 104 in the folded-over position. Such retaining means extend upstream from the folding-over means 5, starting from a location at which the lid 104 has been folded over. The retaining means are able to continue to apply pressure once the sheet 100 has been released from the folding-over means 5.

Such retaining means may take the form of an upper belt extending horizontally, at a height corresponding to that of the sheet 100 or of the container 1 that is to be formed.

The invention claimed is:

1. A device for forming a container by folding a cardboard sheet, said sheet comprising a lid and notably a tab, comprising:

- a conveyor driving said cardboard sheet in a direction of travel;
- a folding-over device for folding over said lid;
- said folding-over device comprising a pressing surface for pressing on said lid, said folding-over device being pivotable about an axis extending in the direction of travel, and wherein said pressing surface thereof is configured to move from an initial position to a deployed position of folding said lid, and vice versa;

wherein:

- said pressing surface is mobile in said direction of travel;
- said pressing surface comprising an endless belt motorized in said direction of travel.

2. The forming device as claimed in claim 1, wherein the folding-over device comprises:

- pinions on which said belt is mounted:
- internally between said pinions, along the pressing surface, a guide against which the back of said belt presses.

3. The forming device as claimed in claim 2, further comprising a controller for controlling, in synchronized manner, the actuation of the movement of said pressing surface and the mobility thereof in said direction of travel with respect to the driving of said conveyor.

4. The forming device as claimed in a claim 2, wherein said folding-over device comprise a fixed structure, said pressing surface being mounted with the ability to pivot on said structure with an angular rotation from said vertical initial position to said deployed position, and vice versa.

5. The forming device as claimed claim 2, further comprising a tab-folding device for folding said tab, the tab-folding device comprising a wheel having a pressing periphery following a folding path of said tab when said wheel is actuated in controlled angular rotation.

6. The forming device as claimed in claim 1, further comprising a controller for controlling, in synchronized manner, the actuation of the movement of said pressing surface and the mobility thereof in said direction of travel with respect to the driving of said conveyor.

7. The forming device as claimed in a claim 6, wherein said folding-over device comprise a fixed structure, said pressing surface being mounted with the ability to pivot on said structure with an angular rotation from said vertical initial position to said deployed position, and vice versa.

8. The forming device as claimed claim 6, further comprising a tab-folding device for folding said tab, the tab-folding device comprising a wheel having a pressing periphery following a folding path of said tab when said wheel is actuated in controlled angular rotation.

9. The forming device as claimed in claim 1, wherein said folding-over device comprise a fixed structure, said pressing surface being mounted with the ability to pivot on said structure with an angular rotation from said vertical initial position to said deployed position, and vice versa.

10. The forming device as claimed claim 9, further comprising a tab-folding device for folding said tab, the tab-folding device comprising a wheel having a pressing periphery following a folding path of said tab when said wheel is actuated in controlled angular rotation.

11. The forming device as claimed claim 1, further comprising a tab-folding device for folding said tab, the tab-folding device comprising a wheel having a pressing periphery following a folding path of said tab when said wheel is actuated in controlled angular rotation.

12. The forming device as claimed in claim 11, wherein pressing periphery of the wheel exhibits a spiral curve.

13. A device for forming a container by folding a cardboard sheet, the cardboard sheet comprising at least a lid and a tab, the device comprising:

a conveyor driving the cardboard sheet in a direction of travel; and a folding-over device for folding the lid of the cardboard sheet while the cardboard sheet travels along the conveyor, the folding-over device comprising a pressing surface for pressing on the lid, the folding-over device being pivotable about an axis extending in the direction of travel such that the pressing surface is movable between an initial upright position and a folded deployed position in which the lid is in a folded configuration, and vice versa, and the pressing surface being mobile in said direction of travel and comprises an endless belt motorized in said direction of travel, wherein the folding action of the pressing surface of the folding-over device during the movement of the sheet along the conveyor, from the initial upright position to the folded deployed position, against the lid of the sheet as it passes thereby along the direction of travel, causes the lid to move in close proximity with the tab so as to secure the same thereto, and wherein the endless belt is synchronized with the velocity of the conveyor along the direction of travel.

* * * * *